No. 833,651. PATENTED OCT. 16, 1906.
W. J. TOOLEY.
MOTOR AND OTHER CYCLE.
APPLICATION FILED NOV. 20, 1905.
2 SHEETS—SHEET 1.
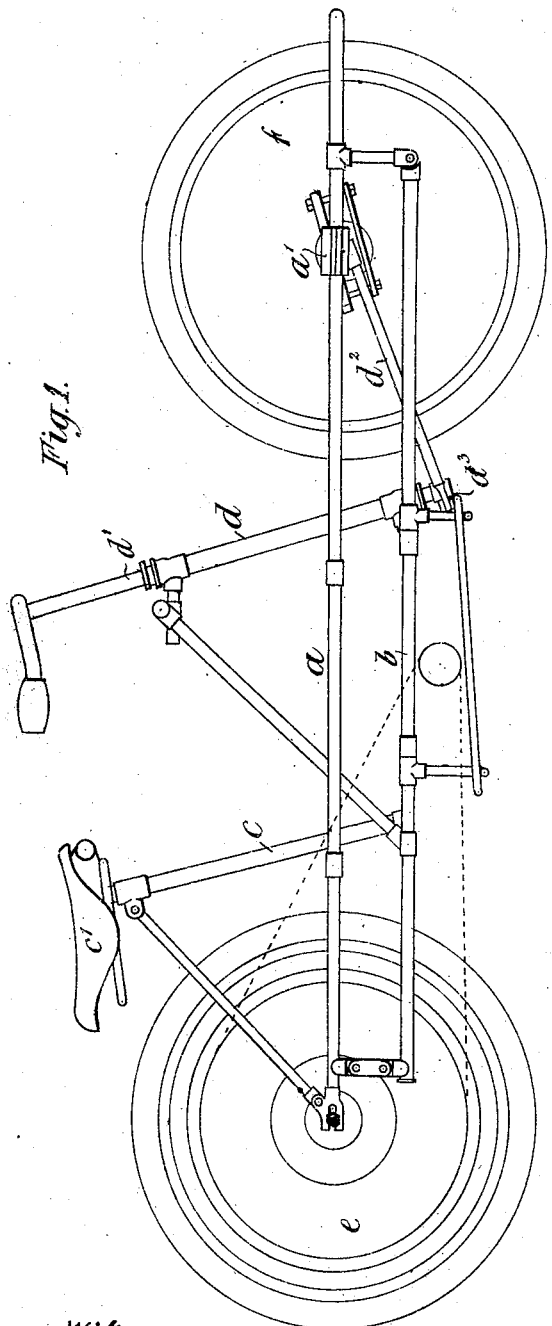
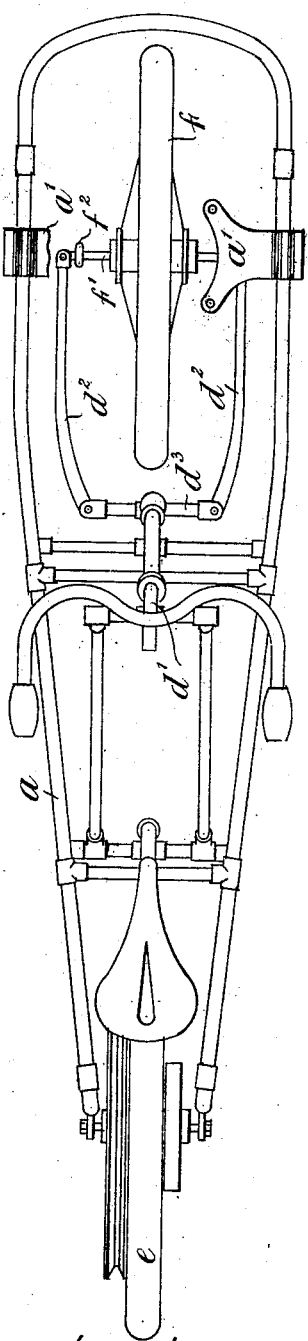

No. 833,651. PATENTED OCT. 16, 1906.
W. J. TOOLEY.
MOTOR AND OTHER CYCLE.
APPLICATION FILED NOV. 20, 1905.

2 SHEETS—SHEET 2.

Witnesses:
J. J. Newman
H. L. Bedingfield

Inventor:
William James Tooley

UNITED STATES PATENT OFFICE.

WILLIAM JAMES TOOLEY, OF GREAT YARMOUTH, ENGLAND.

MOTOR AND OTHER CYCLE.

No. 833,651.  Specification of Letters Patent.  Patented Oct. 16, 1906.

Application filed November 20, 1905. Serial No. 288,292.

*To all whom it may concern:*

Be it known that I, WILLIAM JAMES TOOLEY, a subject of the King of Great Britain and Ireland, and a resident of North Quay, Great Yarmouth, in the county of Norfolk, England, have invented certain new and useful Improvements in or Relating to Motor and other Cycles, of which the following is a specification.

This invention relates to motor and other cycles or light road-carriages; and it consists in an improved construction of frame; whereby the operations of mounting and dismounting are facilitated and whereby the steering-gear is susceptible of less vibration.

Figure 3:
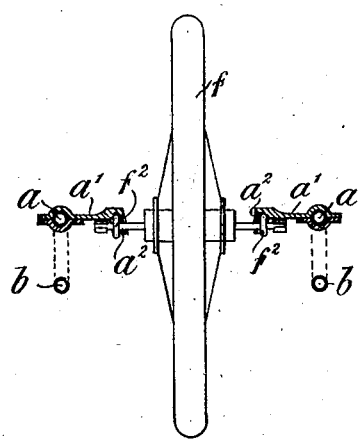
Figure 4:
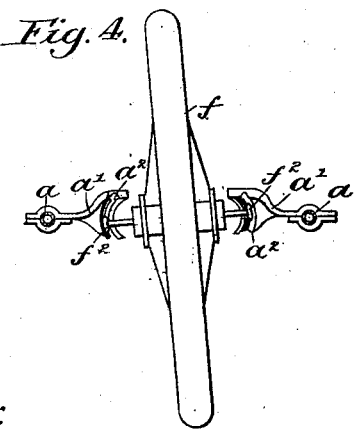

In the accompanying drawings, illustrative of a bicycle constructed according to my invention, Figures 1 and 2 are respectively a side elevation and plan of the machine, while Fig. 3 is a transverse vertical section more particularly intended to explain the construction of the steering mechanism. Fig. 4 is a view similar to Fig. 3, but showing the position assumed by the front wheel when passing round a curve.

The frame comprises an upper member $a$, which is supported upon the front and the rear wheel axles, and two lower members $b$, respectively suspended from the opposite sides of the upper member. To the lower members $b$ are attached the seat-pillar $c$, which supports the seat $c'$, and the pillar $d$, in which the steering-handle and mechanism is mounted. In the case of a motor-cycle the motor is also supported upon the lower members. The frame is supported upon the axle of the rear wheel $e$ in the ordinary manner; but for supporting the front end thereof in relation to the wheel $f$ I attach to the upper member $a$ two brackets $a'$ $a'$ of segmental form and each provided with a curved groove $a^2$. The axle $f'$ of the front wheel is furnished at each extremity with a roller or small wheel $f^2$, adapted to engage the grooves $a^2$ $a^2$ in the brackets $a'$ $a'$. For steering the cycle I connect the steering-rod $d'$ to the extremities of the axle $f'$ by means of links $d^2$, pivoted to arms $d^3$, attached to the rod $d'$. The brackets $a'$ $a'$, in which the rollers $f^2$ are guided, are preferably arranged at such an angle that when the machine is passing round a curve the axle of the front wheel is tilted, as shown in Fig. 4.

In a frame constructed as above described the weight to be carried being supported upon a member suspended beneath the axles of the wheels is less susceptible to vibration than in a frame where the weight is supported above the axles.

What I claim as my invention, and desire to secure by Letters Patent, is—

1. A cycle-frame comprising an upper member supported upon the front and rear axles and two lower members, suspended from the upper member and carrying the seat-pillar and the steering mechanism.

2. In a cycle-frame comprising an upper member supported upon the front and rear axles and two lower members suspended from the upper member, the combination, with the upper member, of two segmental brackets attached to said upper member and provided with curved grooves, an axle furnished with rollers for running on the curved grooves, and links connecting said axle with the steering-handle, substantially as and for the purpose set forth.

In testimony whereof I have signed my name to this specification in the presence of two subscribing witnesses.

WILLIAM JAMES TOOLEY.

Witnesses:
F. J. NEWMAN,
H. G. BEDINGFIELD.